US012759533B2

(12) United States Patent
Mafune et al.

(10) Patent No.: US 12,759,533 B2
(45) **Date of Patent: *Oct. 13, 2026**

(54) DIAGNOSTIC METHOD FOR VEHICLE COOLING SYSTEM AND DIAGNOSTIC DEVICE FOR VEHICLE COOLING SYSTEM

(71) Applicant: NISSAN MOTOR CO., LTD., Yokohama (JP)

(72) Inventors: Toshihiro Mafune, Kanagawa (JP); Ryousuke Satou, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/852,337

(22) PCT Filed: Mar. 28, 2022

(86) PCT No.: PCT/JP2022/014783
§ 371 (c)(1),
(2) Date: Sep. 27, 2024

(87) PCT Pub. No.: WO2023/187853
PCT Pub. Date: Oct. 5, 2023

(65) Prior Publication Data
US 2026/0116372 A1 Apr. 30, 2026

(51) Int. Cl.
*B60W 20/50* (2016.01)
*B60W 40/12* (2012.01)
(Continued)

(52) U.S. Cl.
CPC ............ *B60W 20/50* (2013.01); *B60W 40/12* (2013.01); *B60W 50/029* (2013.01);
(Continued)

(58) Field of Classification Search
CPC .... B60W 20/50; B60W 40/12; B60W 50/029; B60W 2510/0676; B60W 2520/10;
(Continued)

(56) References Cited

FOREIGN PATENT DOCUMENTS

| | | | | |
|---|---|---|---|---|
| CN | 117703580 A | * | 3/2024 | ................ F01P 7/16 |
| CN | 117988965 A | * | 5/2024 | ............. F01P 11/16 |

(Continued)

OTHER PUBLICATIONS

Machine translation of CN-117703580-A.*
(Continued)

*Primary Examiner* — Robert T Nguyen
(74) *Attorney, Agent, or Firm* — Foley & Lardner LLP

(57) ABSTRACT

For a vehicle cooling system for a vehicle where a high-power unit is mounted, it is diagnosed, based on a first temperature and a second temperature, whether a bypass valve is in a state allowing a first coolant to flow to a radiator, or in a state preventing the first coolant from flowing to the radiator. The first temperature is a temperature of the first coolant at a first location of a main passage downstream of the radiator and upstream of a downstream end of a bypass passage in a direction of flow of the first coolant. The second temperature is a temperature of the first coolant at a second location of the main passage downstream of the downstream end of the bypass passage and upstream of the high-power unit in the direction of flow of the first coolant.

17 Claims, 3 Drawing Sheets

(51) Int. Cl.
*B60W 50/029* (2012.01)
*F02M 31/20* (2006.01)

(52) U.S. Cl.
CPC ..... *F02M 31/20* (2013.01); *B60W 2510/0676* (2013.01); *B60W 2520/10* (2013.01)

(58) Field of Classification Search
CPC ..... F02M 31/20; F01P 11/16; F01P 2007/146; F01P 2025/08; F01P 2025/30; F01P 2025/50
See application file for complete search history.

(56) References Cited

FOREIGN PATENT DOCUMENTS

| | | | | | |
|---|---|---|---|---|---|
| CN | 118223978 | A | * | 6/2024 | .............. F01P 7/164 |
| CN | 118934210 | A | * | 11/2024 | .............. F01P 11/14 |
| DE | 102008064941 | B4 | * | 10/2024 | ............. F02M 26/23 |
| JP | 2020-001447 | A | | 1/2020 | |

OTHER PUBLICATIONS

Machine translation of CN-117988965-A.*
Machine translation of CN-118223978-A.*
Machine translation of CN-118934210-A.*
Machine translation of DE-102008064941-B4.*

* cited by examiner

DIAGNOSTIC METHOD FOR VEHICLE COOLING SYSTEM AND DIAGNOSTIC DEVICE FOR VEHICLE COOLING SYSTEM

TECHNICAL FIELD

The present invention relates to a diagnostic method for a vehicle cooling system and a diagnostic device for a vehicle cooling system.

BACKGROUND ART

For example, a patent document 1 discloses a technique to perform a fault diagnosis for a thermostat incorporated in an engine cooling water circuit of a hybrid vehicle.

In patent document 1, the fault diagnosis for the thermostat is implemented by comparing an estimated temperature of cooling water with an actual temperature of the cooling water, wherein the estimated temperature is calculated taking account of changes in temperature of the cooling water for a situation where the thermostat is normal.

However, a hybrid vehicle includes an engine cooling water circuit for cooling an internal combustion engine, and also a cooling circuit for cooling a so-called high-power unit, wherein the high-power unit is composed of units that use electricity as energy, and wherein the units include a driving motor.

In such a cooling circuit for cooling a high-power unit, an allowable water temperature level is lower than that in an engine cooling water circuit. This results in a small difference between temperature of cooling water and outside air temperature (so-called air-water temperature difference), and thereby may adversely affect the accuracy of diagnosis of a state of a thermostat based on an actual temperature difference and an estimated temperature difference.

Therefore, there is room for further improvement in determining a state of a switching valve employed in a cooling circuit for cooling a high-power unit of a hybrid vehicle.

PRIOR ART DOCUMENT(S)

Patent Document(s)

Patent Document 1: Japanese Patent Application Publication No. 2020-1447

SUMMARY OF INVENTION

According to the present invention, for a vehicle cooling system for a vehicle where a high-power unit is mounted, wherein the vehicle cooling system includes a first cooling system structured to cool the high-power unit with a first coolant, and wherein the first cooling system includes: a main passage structured to allow the first coolant to circulate through the main passage; a radiator structured to perform heat exchange with the first coolant; a bypass passage connected to the main passage so as to bypass the radiator; and a bypass valve structured to control a flow rate of the first coolant flowing through the bypass passage, it is diagnosed, based on a first temperature and a second temperature, whether the bypass valve is in a state allowing the first coolant to flow to the radiator, or in a state preventing the first coolant from flowing to the radiator, wherein the first temperature is a temperature of the first coolant at a first location of the main passage downstream of the radiator and upstream of a downstream end of the bypass passage in a direction of flow of the first coolant, and wherein the second temperature is a temperature of the first coolant at a second location of the main passage downstream of the downstream end of the bypass passage and upstream of the high-power unit in the direction of flow of the first coolant.

According to the present invention, the state of the bypass valve can be accurately diagnosed, because of the use of the temperature of the first coolant at the location downstream of the radiator and upstream of the downstream end of the bypass passage, and the temperature of the first coolant at the location downstream of the downstream end of the bypass passage and upstream of the high-power unit.

MODE(S) FOR CARRYING OUT INVENTION

The following describes an embodiment of the present invention in detail with reference to the drawings.

Figure 1:
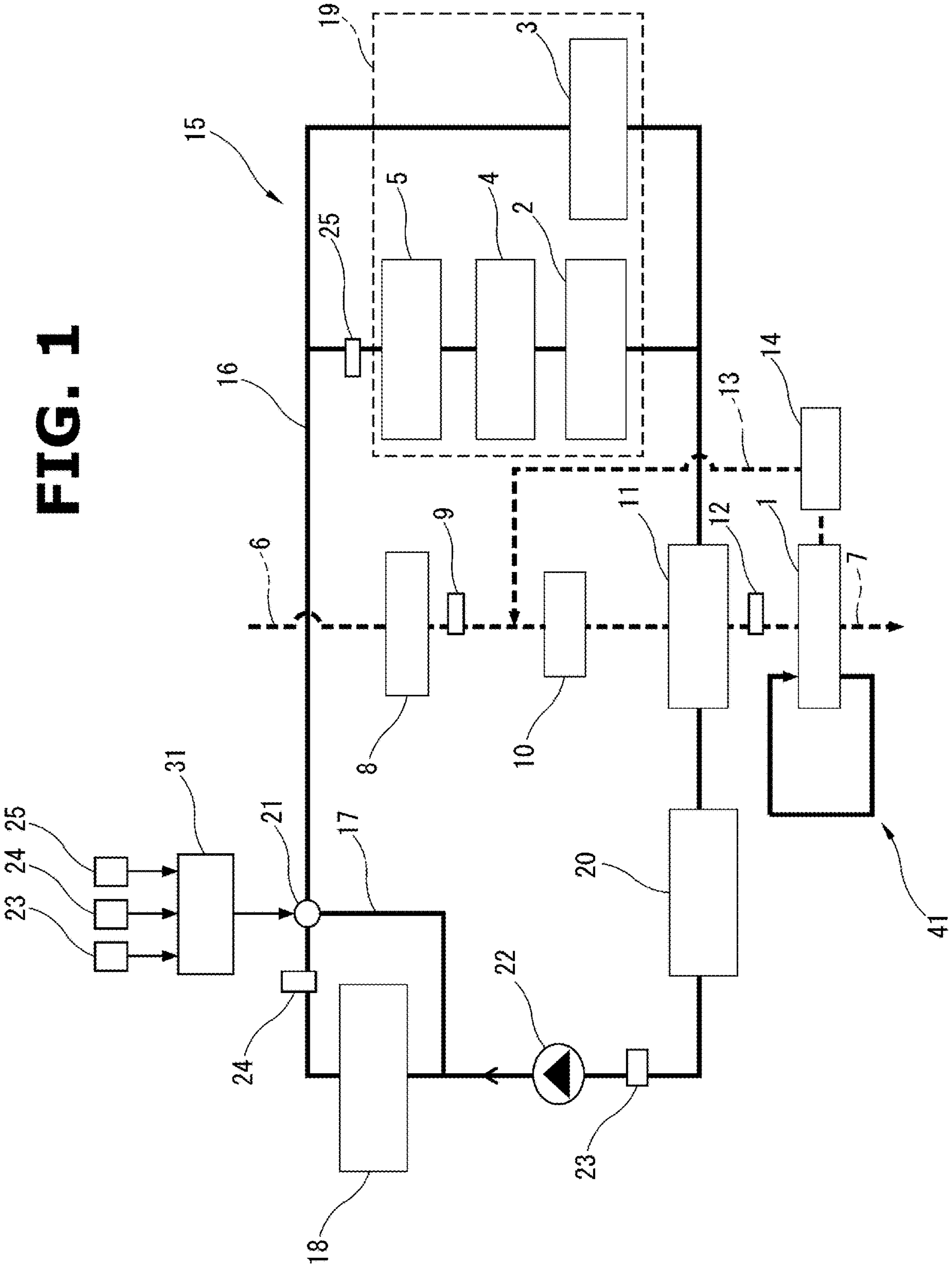
FIG. 1 is an explanatory diagram showing a schematic overview of a vehicle cooling system to which the present invention is applied.

FIG. 1 is an explanatory diagram showing a schematic overview of a vehicle cooling system to which the present invention is applied.

A vehicle to which the present invention is applied is equipped with an internal combustion engine 1 for electric generation, and electric motors 2 and 3 for drive of driving wheels not shown. In other words, the vehicle to which the present invention is applied is a series hybrid vehicle in which entire power of the internal combustion engine 1 is used for electric generation.

The internal combustion engine 1 is mounted on the vehicle for electric generation, and is structured to drive an electric generator 4. Specifically, the internal combustion engine 1 is mechanically coupled with the electric generator 4. Electric power generated by the electric generator 4 is supplied via an inverter 5 to a battery not shown, a front road wheel driving electric motor 2, and a rear road wheel driving electric motor 3. The battery is structured to charge and discharge electric power.

In this example, the front road wheel driving electric motor 2 and the rear road wheel driving electric motor 3 are each composed of a synchronous motor having a rotor employing a permanent magnet. The front road wheel driving electric motor 2 and the rear road wheel driving electric motor 3 are driven by AC power supplied from the inverter 5. Furthermore, the front road wheel driving electric motor 2 and the rear road wheel driving electric motor 3 function as electric generators when the vehicle is decelerating. Accordingly, the front road wheel driving electric motor 2 and the rear road wheel driving electric motor 3 are capable of charging the battery via the inverter 5 with regenerative energy generated during deceleration of the vehicle.

The internal combustion engine 1 further includes an intake passage 6 and an exhaust passage 7. An air filter 8, an airflow meter 9, a supercharger 10, an intercooler 11, and an intake air temperature sensor 12 are arranged in the intake passage 6 in this order from the upstream side of the intake passage 6.

The air filter 8 is structured to collect and remove foreign matter from intake air. The airflow meter 9 is structured to sense a quantity of intake air. The airflow meter 9 is capable of sensing a temperature of intake air. A sensed value of the airflow meter 9 is used to estimate an outside air temperature. The supercharger 10 is structured to supercharge the intake air of the internal combustion engine 1. The supercharger 10 may be implemented by a compressor of a turbocharger or may be implemented by an electric supercharger. The intercooler 11 serves as a cooler, and cools the intake air of the internal combustion engine 1 that is supercharged by the supercharger 10. The intercooler 11 belongs to a first cooling system 15 detailed below, and is cooled by first cooling water. The intercooler 11 is a so-called charge air cooler. The intake air temperature sensor 12 is structured to sense a temperature of intake air at a location downstream of the intercooler 11.

Furthermore, the internal combustion engine 1 is structured to perform exhaust gas recirculation (EGR) in which a part of exhaust gas from the exhaust passage 7 is introduced (recirculated) into the intake passage 6 as EGR gas. The internal combustion engine 1 includes an exhaust gas recirculation passage (EGR passage) 13 that is branched from the exhaust passage 7 and connected to the intake passage 6.

The EGR passage 13 includes a first end that is a downstream end in the direction of flow of the EGR gas and is connected to the intake passage 6, and a second end that is an upstream end in the flow direction of the EGR gas and is connected to the exhaust passage 7. The first end of the EGR passage 13 is connected to the intake passage 6 at a location upstream of the turbocharger 10 and downstream of the airflow meter 9. The EGR passage 13 is provided with an electric EGR valve 14 for regulating (controlling) the flow rate of EGR gas in the EGR passage 13. A sensed value of the intake air temperature sensor 12 is used to control the EGR valve 14. Namely, a sensed value of the intake air temperature sensor 12 is used for EGR control.

The electric generator 4, the inverter 5, the front road wheel driving electric motor 2, the rear road wheel driving electric motor 3, and the intercooler 11 are structured to be cooled by the first cooling water serving as a first coolant.

The first cooling water is allowed to circulate through a main passage 16 in the first cooling system 15. The first cooling system 15 includes the main passage 16 and a bypass passage 17 that is branched from the main passage 16 and bypasses a radiator 18 detailed below. The bypass passage 17 is structured to receive inflow of the first cooling water.

The first cooling water is allowed to cool the electric generator 4, the inverter 5, the front road wheel driving electric motor 2, the rear road wheel driving electric motor 3 and the intercooler 11, and is allowed to perform heat exchange (cooling) with the radiator 18 arranged in the main passage 16.

In other words, the first cooling system 15 includes the main passage 16, the radiator 18, the inverter 5, the intercooler 11, the electric generator 4, the front road wheel driving electric motor 2, the rear road wheel driving electric motor 3, and the bypass passage 17. In other words, the first cooling system 15 cools the inverter 5, the electric generator 4, the front road wheel driving electric motor 2, and the rear road wheel driving electric motor 3, which constitute an on-board high-power unit 19. The high-power unit 19 is a collection of units that use electricity as energy. In this description, the high-power unit 19 includes the inverter 5, the electric generator 4, the front road wheel driving electric motor 2, and the rear road wheel driving electric motor 3 as components. In this embodiment, the front road wheel driving electric motor 2 and the rear road wheel driving electric motor 3 are arranged in parallel in the first cooling system 15.

The first cooling system 15 further includes a reservoir tank 20 for the first cooling water, a bypass valve 21 for controlling the flow rate of the first cooling water flowing through the bypass passage 17, a water pump 22 for pumping the first cooling water, and first to third temperature sensors 23, 24, 25 for sensing temperatures of the first cooling water at specific locations in the main passage 16 (in the first cooling system 15).

The reservoir tank 20 is structured to store the first cooling water therein. The reservoir tank 20 is located downstream of the intercooler 11 in the first cooling system 15.

The bypass passage 17 includes a first end that is a downstream end in the direction of flow of the first cooling water, and is connected to the main passage 16 at a location downstream of the radiator 18 in the direction of flow of the first cooling water, and includes a second end that is an upstream end in the direction of flow of the first cooling water, and is connected to the main passage 16 at a location upstream of the radiator 18. The first cooling water circulates in the main passage 16 in a clockwise direction in FIG. 1. In other words, the first cooling water flows into the water pump 22 via the intercooler 11 and is discharged from the water pump 22 toward the radiator 18.

The bypass valve 21 is an electromagnetic three-way valve arranged at a portion of connection between the first end of the bypass passage 17 and the main passage 16. The bypass valve 21 is structured to prevent the first cooling water from flowing through the bypass passage 17 and thereby allow the first cooling water to flow through the radiator 18 and circulate through the main passage 16, or prevent the first cooling water from flowing through the radiator 18 and thereby allow the first cooling water to pass through the bypass passage 17 and circulate through the main passage 16. Namely, at the portion of connection between the first end of the bypass passage 17 and the main passage 16, the bypass valve 21 is capable of opening the main passage 16 so as to allow the first cooling water to flow through the radiator 18 and further downstream, while closing the bypass passage 17 so as to prevent the first cooling water from flowing from the bypass passage 17 to the downstream side of the bypass passage 17. Furthermore, at the portion of connection between the first end of the bypass passage 17 and the main passage 16, the bypass valve 21 is capable of closing the main passage 16 so as to prevent the first cooling water from flowing from the radiator 18 to the downstream side of the radiator 18, while opening the bypass passage 17 so as to allow the first cooling water to flow through the bypass passage 17 and further downstream.

The bypass valve 21 is opened and closed in accordance with a command from a control unit 31. The opening and closing of the bypass valve 21 is controlled based on output signals (sensed temperatures) from the first temperature sensor 23, the second temperature sensor 24, the third temperature sensor 25, etc., which are inputted to the control unit 31.

Basically, the bypass valve 21 is controlled so that, when the temperature of the first cooling water is high (for example, 40° C. or higher), the first cooling water flows into the radiator 18, and when the temperature of the first cooling water is low (for example, below 40° C.), the first cooling water flows into the bypass passage 17 and does not flow into the radiator 18.

In this way, the bypass valve 21 controls the flow rate of the first cooling water flowing through the radiator 18 and the flow rate of the first cooling water flowing through the bypass passage 17.

The water pump 22 applies pressure to the first cooling water and discharges the first cooling water so that the first cooling water circulates (flows) through the first cooling system 15.

The first temperature sensor 23 is located in the main passage 16 upstream of the water pump 22 and downstream of the reservoir tank 20 in the flow direction of the first cooling water. The first temperature sensor 23 senses a temperature of the first cooling water at a location of the main passage 16 downstream of the intercooler 11 and upstream of the radiator 18 in the flow direction of the first cooling water. In other words, the first temperature sensor 23 senses a temperature of the first cooling water at a third location of the main passage 16 downstream of the high-power unit 19 and upstream of the radiator 18 in the flow direction of the first cooling water.

The second temperature sensor 24 is located in the main passage 16 upstream of the bypass valve 21 and downstream of the radiator 18 in the flow direction of the first cooling water. The second temperature sensor 24 senses a temperature of the first cooling water at a location of the main passage 16 downstream of the radiator 18 and upstream of the bypass valve 21 in the flow direction of the first cooling water. In other words, the second temperature sensor 24 senses a temperature of the first cooling water at a first location of the main passage 16 downstream of the radiator 18 and upstream of the downstream end of the bypass passage 17 (upstream of the bypass valve 21) in the flow direction of the first cooling water.

The third temperature sensor 25 is located in the main passage 16 upstream of the inverter 5 and downstream of the bypass valve 21 in the flow direction of the first cooling water. The third temperature sensor 25 senses a temperature of the first cooling water at a location of the main passage 16 downstream of the downstream end of the bypass passage 17 and upstream of the high-power unit 19 in the flow direction of the first cooling water. In other words, the third temperature sensor 25 senses a temperature of the first cooling water at a second location of the main passage 16 downstream of the downstream end of the bypass passage 17 and upstream of the high-power unit 19 (upstream of the inverter 5) in the flow direction of the first cooling water.

The intercooler 11 is located in the first cooling system 15 downstream of the high-power unit 19 in the flow direction of the first cooling water. The high-power unit 19 is located in the first cooling system 15 downstream of the bypass valve 21 in the flow direction of the first cooling water.

Furthermore, the internal combustion engine 1 includes a cylinder block and a cylinder head which are structured to be cooled with second cooling water serving as a second coolant. The second cooling water is allowed to circulate within a second cooling system 41.

Although not shown, an EGR cooler, an oil cooler of the internal combustion engine 1, a heater core of an on-board air conditioner, a throttle chamber, etc. are arranged in the second cooling system 41. The second cooling water cools the EGR cooler, the oil cooler, the throttle chamber, etc. in the second cooling system 41. The second cooling water further serves as a heat source for the heater core and others in the second cooling system 41.

The vehicle cooling system described above is configured to cause the bypass valve 21 to switch the flow of the first cooling water in the first cooling system 15 so that the first cooling water does not flow to the radiator 18, in response to a condition that the temperature of the first cooling water sensed by the first temperature sensor 23 is below a first predetermined value (for example, 40° C.). Specifically, when the temperature of the first cooling water sensed by the first temperature sensor 23 is lower than the first predetermined value (for example, 40° C.), the bypass valve 21 closes the main passage 16 and opens the bypass passage 17.

Furthermore, the vehicle cooling system is configured to cause the bypass valve 21 to switch the flow of the first cooling water in the first cooling system 15 so that the first cooling water flows into the radiator 18, in response to a condition that the temperature of the first cooling water sensed by the first temperature sensor 23 is higher than or equal to the first predetermined value (for example, 40° C.). Specifically, when the temperature of the first cooling water sensed by the first temperature sensor 23 is higher than or equal to the first predetermined value (for example, 40° C.), the bypass valve 21 opens the main passage 16 and closes the bypass passage 17.

The control unit 31 of the vehicle serves as a diagnostic section, and diagnoses whether the bypass valve 21 is in a state allowing the first cooling water to flow to the radiator 18 or in a state preventing the first cooling water from flowing to the radiator 18, based on the temperature of the first cooling water at the first location of the main passage 16 and the temperature of the first cooling water at the second location of the main passage 16. Specifically, the control unit 31 diagnoses whether or not the bypass valve 21 is in a state allowing the first cooling water to flow to the radiator 18, based on a difference between the cooling water temperature at the first location of the main passage 16 and the cooling water temperature at the second location of the main passage 16, and/or a ratio between the cooling water temperature at the first location of the main passage 16 and the cooling water temperature at the second location of the main passage 16.

When the first cooling water is flowing into the radiator 18, the first cooling water at the first location of the main passage 16 and the first cooling water at the second location of the main passage 16 have been cooled (heat exchanged) at the radiator 18.

On the other hand, when the first cooling water is not flowing into the radiator 18, the first cooling water at the first location of the main passage 16 remains at this location so that the temperature at the first location shows almost no change over time. On the other hand, the first cooling water at the second location of the main passage 16 receives heat every time the first cooling water cools the high-power unit 19, so that the temperature of the first cooling water at the second location rises.

Therefore, the control unit 31 is capable of accurately determining the state of the bypass valve 21 by using the temperature of the first cooling water at the first location of the main passage 16 and the temperature of the first cooling water at the second location of the main passage 16.

When the temperature of the first cooling water at the third location of the main passage 16 (the temperature of the first cooling water sensed by the first temperature sensor 23) is less than the first predetermined value (for example, 40° C.), the control unit 31 diagnoses that the bypass valve 21 is in a state where the bypass valve 21 cannot cause the first cooling water to flow to the radiator 18, i.e., the bypass valve 21 is in a state where the main passage 16 is closed by the bypass valve 21 and the first cooling water is not flowing into the radiator 18. When the temperature of the first cooling water at the third location of the main passage 16

(the temperature of the first cooling water sensed by the first temperature sensor 23) is greater than or equal to the first predetermined value (for example, 40° C.), the control unit 31 diagnoses that the bypass valve 21 is in a state where the bypass valve 21 can cause the first cooling water to flow to the radiator 18, i.e., the bypass valve 21 is in a state where the bypass passage 17 is closed by the bypass valve 21 and the first cooling water is flowing into the radiator 18.

Then, when the state of the bypass valve 21 identified by diagnosis based on the temperatures of the first cooling water at the first location of the main passage 16 and at the second location of the main passage 16 differs from the state of the bypass valve 21 identified by diagnosis based on the temperature of the first cooling water at the third location of the main passage 16, the control unit 31 diagnoses that the bypass valve 21 is faulty.

Specifically, the control unit 31 diagnoses that the bypass valve 21 is faulty, in response to a condition that the temperature of the first cooling water at the third location of the main passage 16 (the temperature of the first cooling water sensed by the first temperature sensor 23) is higher than or equal to the first predetermined value (for example, 40° C.) and the difference between the temperature of the first cooling water at the first location of the main passage 16 (the temperature of the first cooling water sensed by the second temperature sensor 24) and the temperature of the first cooling water at the second location of the main passage 16 (the temperature of the first cooling water sensed by the third temperature sensor 25) is greater than a second predetermined value (for example, 15° C.).

This is a situation in which the bypass valve 21 should be opened and allow cooling water to flow to the radiator 18, but in reality no cooling water is flowing to the radiator 18, resulting in a difference between the values of the second temperature sensor 24 and the third temperature sensor 25. This is a situation in which the bypass valve 21 is diagnosed as faulty and having a faulty of closing the flow of cooling water to the radiator 18 (valve closing fault).

Furthermore, the control unit 31 diagnoses that the bypass valve 21 is faulty, in response to a condition that the temperature of the first cooling water at the third location of the main passage 16 (the temperature of the first cooling water sensed by the first temperature sensor 23) is below a third predetermined value (for example, 10° C.) and the difference between the temperature of the first cooling water at the first location of the main passage 16 (the temperature of the first cooling water sensed by the second temperature sensor 24) and the temperature of the first cooling water at the second location of the main passage 16 (the temperature of the first cooling water sensed by the third temperature sensor 25) is less than the second predetermined value (for example, 15° C.).

This is a situation in which the bypass valve 21 should be closed and allow no cooling water to flow to the radiator 18, but in reality cooling water is flowing to the radiator 18, resulting in no difference between the values of the second temperature sensor 24 and the third temperature sensor 25. This is a situation in which the bypass valve 21 is diagnosed as faulty and having a faulty of opening the flow of cooling water to the radiator 18 (valve opening fault).

In this way, the control unit 31 is capable of performing a diagnosis (fault diagnosis) for the bypass valve 21 based on the temperatures of the first cooling water at the locations of the first cooling system 15.

Furthermore, the control unit 31 diagnoses whether or not the bypass valve 21 is faulty, after a heat quantity supplied to the first cooling water from the high-power unit 19 has reached a predetermined value after a system startup (after the vehicle starts running).

The vehicle is capable of preventing the fault diagnosis for the bypass valve 21 from being erroneously performed, by suspending the fault diagnosis when there is no temperature difference among the temperatures of the first cooling water sensed by the temperature sensors 23, 24, 25, such as during a cold start.

In this example, an integrated heat quantity Q, which is a quantity of heat supplied to the first cooling water from the high-power unit 19 after the system is started up, is calculated as follows.

Figure 2:
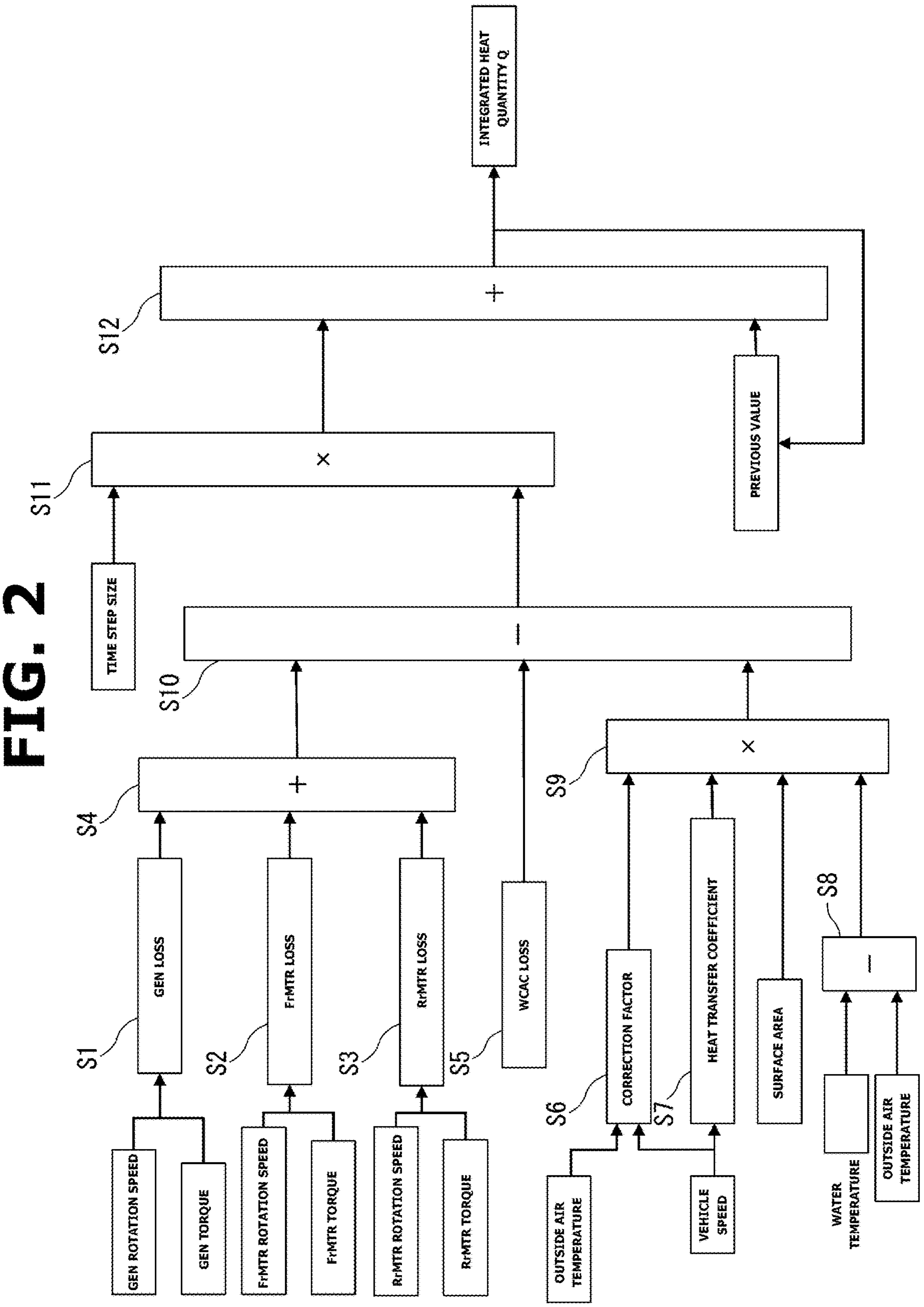
FIG. 2 is an explanatory diagram schematically showing a process of calculation of an integrated heat quantity.

FIG. 2 is an explanatory diagram showing a schematic diagram of a process of calculation of the integrated heat quantity Q, which is performed in the control unit 31.

At Step S1, the rotation speed of the electric generator 4 and the torque of the electric generator 4 are used to calculate a "GEN" loss, which is a quantity of loss (power) in the electric generator 4. In this example, the GEN loss is calculated, using a map that associates the rotation speed of the electric generator 4, the torque of the electric generator 4, and the GEN loss. The GEN loss is a quantity of heat dissipated from the electric generator 4 to the first cooling system 15. The GEN loss increases as the rotation speed of the electric generator 4 increases, and as the torque of the electric generator 4 increases.

At Step S2, the rotation speed of the front road wheel driving electric motor 2 and the torque of the front road wheel driving electric motor 2 are used to calculate an "FrMTR" loss, which is a quantity of loss (power) in the front road wheel driving electric motor 2. In this example, the FrMTR loss is calculated, using a map that associates the rotation speed of the front road wheel driving electric motor 2, the torque of the front road wheel driving electric motor 2, and the FrMTR loss. The FrMTR loss is a quantity of heat dissipated from the front road wheel driving electric motor 2 to the first cooling system 15. The FrMTR loss increases as the rotation speed of the front road wheel driving electric motor 2 increases, and as the torque of the front road wheel driving electric motor 2 increases.

At Step S3, the rotation speed of the rear road wheel driving electric motor 3 and the torque of the rear road wheel driving electric motor 3 are used to calculate an "RrMTR" loss, which is a quantity of loss (power) in the rear road wheel driving electric motor 3. In this example, the RrMTR loss is calculated, using a map that associates the rotation speed of the rear road wheel driving electric motor 3, the torque of the rear road wheel driving electric motor 3, and the RrMTR loss. The RrMTR loss is a quantity of heat dissipated from the rear road wheel driving electric motor 3 to the first cooling system 15. The FrMTR loss increases as the rotation speed of the rear road wheel driving electric motor 3 increases, and as the torque of the rear road wheel driving electric motor 3 increases.

At Step S4, the GEN loss, the FrMTR loss, and the FrMTR loss are summed to calculate a quantity of loss (power) of the high-power unit 19. The quantity of loss is expressed in the unit of watts.

At Step S5, the intake air temperature and intake air flow rate at the outlet side of the turbocharger 10 are used to calculate a "WCAC" loss (power), which is a quantity of heat exchanged at the intercooler 11. In this example, the intake air temperature and the intake air flow rate are calculated based on the intake air temperature sensed by the airflow meter 9 and the engine speed and load of the internal combustion engine 1. The WCAC loss increases as the intake temperature increases, and as the intake flow rate increases. The WCAC loss is expressed in the unit of watts.

At Step S6, the outside air temperature and the vehicle speed are used to calculate a correction factor. In this example, the correction factor is calculated, using a map that associates the outside air temperature estimated from the sensed value of the airflow meter 9, the vehicle speed of the vehicle where the vehicle cooling system is mounted (sensed by a vehicle speed sensor in this example), and the correction factor.

At Step S7, the vehicle speed is used to calculate a heat transfer coefficient of a quantity of heat dissipated from the high-power unit 19 to an external part (other than the first cooling system 15). In this example, the heat transfer coefficient is calculated, using an approximate expression using the vehicle speed. The heat transfer coefficient increases as the vehicle speed increases.

At Step S8, a temperature difference is calculated between the temperature T1 of the first cooling water sensed by the first temperature sensor 23 and the outside air temperature estimated from the sensed value of the airflow meter 9.

At Step S9, the power of the work performed by the high-power unit 19 to the external part (other than the first cooling system 15) is calculated by multiplying the correction factor, the heat transfer coefficient, the temperature difference between the temperature T1 of the first cooling water sensed by the first temperature sensor 23 and the outside air temperature, and a surface area of the high-power unit 19. The power calculated at Step S9 is expressed in the unit of watts.

The power calculated at Step S9 is a power supplied from the high-power unit 19 to the outside of the first cooling system 15 (for example, into an engine compartment of the hybrid vehicle).

At Step S10, a value is calculated by subtracting the power from the high-power unit 19 to the external part (other than the first cooling system 15) from the quantity of loss in the high-power unit 19. Namely, at Step S10, the power outputted from the high-power unit 19 to the first cooling water of the first cooling system 15 is calculated.

At Step S11, the power calculated at Step S10 is multiplied by a time step size to calculate a quantity of heat transferred from the high-power unit 19 to the first cooling water in the current cycle. The heat quantity calculated at Step S11 is expressed in the unit of joules. The quantity of heat calculated at Step S11 is a difference between a quantity of heat generated by the high-power unit 19 per unit time (per cycle) and a quantity of heat dissipated per unit time (per cycle) transferred from the high-power unit 19 to the outside of the first cooling system 15 (for example, into the engine compartment of the vehicle).

At Step S12, the quantity of heat transferred from the high-power unit 19 to the first cooling water in the current cycle is added to a previous value (a quantity of heat transferred from the high-power unit 19 to the first cooling water until a previous calculation after the system is started up) to calculate the integrated heat quantity Q that is supplied from the high-power unit 19 to the first cooling water in the first cooling system 15.

The integrated heat quantity Q calculated by the control unit 31 is an integrated value of the difference between the heat quantity generated by the high-power unit 19 per unit time (per cycle) and the heat quantity dissipated per unit time (per cycle) transferred from the high-power unit 19 to the outside of the first cooling system 15 (for example, into the engine compartment of the hybrid vehicle). The quantity of heat dissipated per unit time (per cycle) transferred from the high-power unit 19 to the outside of the first cooling system 15 (for example, into the engine compartment of a hybrid vehicle) is calculated using the vehicle speed, the outside air temperature, and the temperature of the first cooling water sensed by the first temperature sensor 23.

The internal combustion engine 1 of the vehicle is structured such that a part of the exhaust gas is introduced upstream of the intercooler 11. Accordingly, a part of the exhaust gas can be recirculated to the internal combustion engine 1 even at lower outside air temperatures, thereby improving fuel efficiency.

Figure 3:
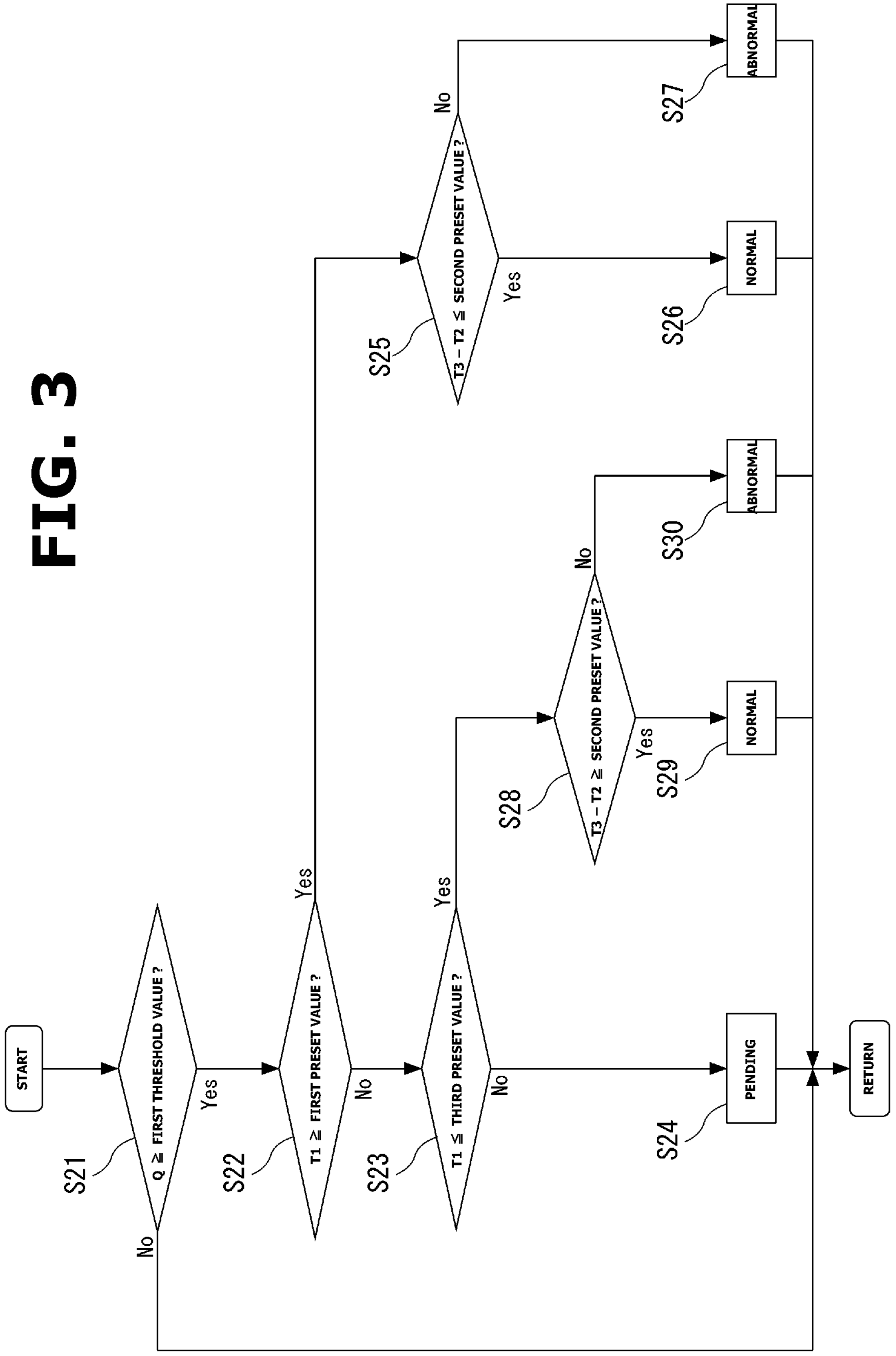
FIG. 3 is a flowchart showing a flow of diagnosis of a first cooling system.

FIG. 3 is a flow chart showing a flow of diagnosis for the first cooling system 15, which is performed in the control unit 31.

At Step S21, it is determined whether the integrated heat quantity Q is greater than or equal to a first predetermined threshold value. The first threshold value is such as to allow a temperature difference to occur between the temperatures sensed by the temperature sensor 23, 24, 25, namely, between the temperature of the first cooling water sensed by the first temperature sensor 23 and the temperature of the first cooling water sensed by the second temperature sensor 24, and between the temperature of the first cooling water sensed by the first temperature sensor 23 and the temperature of the first cooling water sensed by the third temperature sensor 25. Specifically, in this example, the first threshold value is such as to increase the temperature of the first cooling water by 15° C. At Step S21, when the integrated heat quantity Q is greater than or equal to the first threshold value, the process proceeds to Step S22. At Step S21, when the integrated heat quantity Q is less than the first threshold value, the current routine is terminated.

At Step S22, it is determined whether or not the temperature T1 of the first cooling water sensed by the first temperature sensor 23 is higher than or equal to the first predetermined value (for example, 40° C.). At Step S22, when the temperature T1 sensed by the first temperature sensor 23 is higher than or equal to the first predetermined value (for example, 40° C.), the process proceeds to Step S25. At Step S22, when the temperature T1 sensed by the first temperature sensor 23 is less than the first predetermined value (for example, 40° C.), the process proceeds to Step S23.

At Step S23, it is determined whether or not the temperature T1 of the first cooling water sensed by the first temperature sensor 23 is lower than or equal to the third predetermined value (for example, 10° C.). At Step S23, when the temperature T1 sensed by the first temperature sensor 23 is lower than or equal to the third predetermined value (for example, 10° C.), the process proceeds to Step S28. At Step S23, when the temperature T1 sensed by the first temperature sensor 23 is higher than the third predetermined value (for example, 10° C.), the process proceeds to Step S24.

At Step S24, it is not determined whether or not the bypass valve 21 is faulty and this determination is left pending.

At Step S25, it is determined whether or not the difference between the temperature T3 of the first cooling water sensed by the third temperature sensor 25 and the temperature T2 of the first cooling water sensed by the second temperature sensor 24 is less than or equal to the second predetermined value (for example, 15° C.).

At Step S25, when the difference between the temperature T3 sensed by the third temperature sensor 25 and the temperature T2 sensed by the second temperature sensor 24 is smaller than or equal to the second predetermined value, the process proceeds to Step S26. At Step S25, when the difference between the temperature T3 sensed by the third temperature sensor 25 and the temperature T2 sensed by the second temperature sensor 24 is larger than the second predetermined value, the process proceeds to Step S27.

At Step S26, it is determined that the bypass valve 21 is operating normally.

At Step S27, it is determined that the bypass valve 21 has an abnormality.

At Step S28, it is determined whether the difference between the temperature T3 of the first cooling water sensed by the third temperature sensor 25 and the temperature T2 of the first cooling water sensed by the second temperature sensor 24 is greater than or equal to the second predetermined value (for example, 15° C.).

At Step S28, when the difference between the temperature T3 sensed by the third temperature sensor 25 and the temperature T2 sensed by the second temperature sensor 24 is greater than or equal to the second predetermined value, the process proceeds to Step S29. At Step S28, when the difference between the temperature T3 sensed by the third temperature sensor 25 and the temperature T2 sensed by the second temperature sensor 24 is less than the second predetermined value, the process proceeds to Step S30.

At Step S29, it is determined that the bypass valve 21 is operating normally.

At Step S30, it is determined that the bypass valve 21 has an abnormality.

The temperature T1 used at Steps S22 and S23 may be an average temperature during a period from the previous routine to the present routine. Furthermore, the difference between the temperature T3 and the temperature T2 used at Steps S25 and S28 may be an average value of the difference during the period from the previous routine to the present routine.

Although specific embodiments of the present invention have been described above, the present invention is not limited to the embodiments described above, but various modifications are possible without departing from the substance of the present invention.

For example, the front road wheel driving electric motor 2 and the rear road wheel driving electric motor 3 may be arranged in series in the first cooling system 15.

Furthermore, the order of arrangement of the components (the electric generator 4, etc.) of the high-power unit 19 in the first cooling system 15 is not limited to the order of arrangement in the embodiment described above. For example, the driving motors 2 and 3 may be arranged upstream of the electric generator 4, or the electric generator 4 and the driving motors 2 and 3 may be arranged upstream of the inverter 5.

In the embodiment described above, the bypass valve 21 is an electromagnetic valve. However, the bypass valve 21 may be a thermostat that opens and closes the main passage 16 and the bypass passage 17 at the portion of connection between the first end of the bypass passage 17 and the main passage 16 in accordance with the temperature of the first cooling water.

The present invention is also applicable to hybrid vehicles in which only front road wheels are driving wheels, and hybrid vehicles in which only rear road wheels are driving wheels. In other words, the high-power unit 19 to be cooled by the first cooling system 15 may include at least one of the front road wheel driving electric motor 2 and the rear road wheel driving electric motor 3.

The vehicle control unit 31 may be configured to diagnose whether or not the bypass valve 21 is in a state allowing the first cooling water to flow to the radiator 18, based on the temperature of the first cooling water at the first location in the main passage 16 and a temperature of the first cooling water calculated (estimated) based on the heat quantity, after the heat quantity supplied to the first cooling water from the high-power unit 19 has reached a predetermined value after the system is started up (after the vehicle starts running).

Specifically, the control unit 31 may be configured to diagnose that the bypass valve 21 is in a state allowing the first cooling water to flow to the radiator 18, for example, when the difference between the temperature of the first cooling water at the first location of the main passage 16 and the temperature of the first cooling water calculated (estimated) based on the above-mentioned heat quantity is greater than or equal to a predetermined value. Furthermore, the control unit 31 may be configured to diagnose that the bypass valve 21 is in a state preventing the first cooling water from flowing to the radiator 18, for example, when the difference between the temperature of the first cooling water at the first location of the main passage 16 and the temperature of the first cooling water calculated (estimated) based on the above-mentioned heat quantity is less than the predetermined value.

The temperature of the first cooling water can be estimated based on a quantity of heat transferred from the high-power unit 19. Accordingly, when the first cooling water is flowing into the radiator 18, the temperature of the first cooling water at the location (first location) downstream of the radiator 18 and upstream of the downstream end of the bypass passage 17 (upstream of the bypass valve 21) should have a temperature difference with respect to the temperature of the first cooling water calculated (estimated) from the above-mentioned heat quantity. This temperature difference is a temperature drop through the radiator 18.

When this temperature difference is greater than or equal to a predetermined value, it is determined that the first cooling water is flowing through the radiator 18. When the temperature difference is less than the predetermined value, it is determined that the first cooling water is not flowing into the radiator 18.

When the first cooling water is flowing into the radiator 18, the first cooling water at the first location of the main passage 16 is cooled (heat exchanged) by the radiator 18. Therefore, when the first cooling water is flowing into the radiator 18, the temperature of the first cooling water at the first location in the main passage 16 should have a temperature difference with respect to the temperature of the first cooling water at the third location in the main passage 16.

The embodiments described above relate to a method and a device for diagnosing a vehicle cooling system.

The invention claimed is:

1. A diagnostic method for a vehicle cooling system for a vehicle where a high-power unit is mounted, wherein the vehicle cooling system includes a first cooling system structured to cool the high-power unit with a first coolant, and wherein the first cooling system includes: a main passage structured to allow the first coolant to circulate through the main passage; a radiator structured to perform heat exchange with the first coolant; a bypass passage connected to the main passage so as to bypass the radiator; and a bypass valve structured to control a flow rate of the first coolant flowing through the bypass passage, the diagnostic method comprising:

receiving, by a controller, a first temperature of the first coolant at a first location of the main passage downstream of the radiator and upstream of a downstream end of the bypass passage in a direction of flow of the first coolant;

receiving, by the controller, a second temperature of the first coolant at a second location of the main passage downstream of the downstream end of the bypass passage and upstream of the high-power unit in the direction of flow of the first coolant; and diagnosing, by the controller, based on the first temperature and the second temperature, whether the bypass valve is in a state allowing the first coolant to flow to the radiator, or in a state preventing the first coolant from flowing to the radiator.

2. The diagnostic method as claimed in claim 1, comprising:

diagnosing that the bypass valve is in the state preventing the first coolant from flowing to the radiator, in response to a condition that a third temperature is lower than a first predetermined value, wherein the third temperature is a temperature of the first coolant at a third location of the main passage downstream of the high-power unit and upstream of the radiator in the direction of flow of the first coolant;

diagnosing that the bypass valve is in the state allowing the first coolant to flow to the radiator, in response to a condition that the third temperature is higher than or equal to the first predetermined value; and diagnosing that the bypass valve is faulty, in response to a condition that the state of the bypass valve identified by the diagnosis based on the first temperature and the second temperature is different from the state of the bypass valve identified by the diagnosis based on the third temperature.

3. The diagnostic method as claimed in claim 2, comprising diagnosing that the bypass valve is faulty, in response to a condition that the third temperature is higher than or equal to the first predetermined value, and a difference between the first temperature and the second temperature is larger than a second predetermined value.

4. The diagnostic method as claimed in claim 2, comprising diagnosing that the bypass valve is faulty, in response to a condition that the third temperature is lower than or equal to a third predetermined value, and a difference between the first temperature and the second temperature is larger than a second predetermined value.

5. The diagnostic method as claimed in claim 1, comprising starting to diagnose the bypass valve, in response to a condition that a heat quantity transferred from the high-power unit to the first coolant after a startup of the vehicle cooling system has reached a predetermined value.

6. The diagnostic method as claimed in claim 5, comprising:

calculating the heat quantity by subtracting a dissipated heat quantity from a generated heat quantity, wherein the dissipated heat quantity is a quantity of heat dissipated from the high-power unit into an engine compartment of the vehicle being a hybrid vehicle, and wherein the generated heat quantity is a quantity of heat generated by the high-power unit due to a loss in the high-power unit; and calculating the dissipated heat quantity, based on vehicle speed of the hybrid vehicle, outside air temperature, and temperature of the first coolant.

7. The diagnostic method as claimed in claim 5, wherein the first cooling system includes a cooler structured to cool supercharged intake air supplied to an internal combustion engine mounted on the vehicle, the diagnostic method comprising calculating the heat quantity, taking account of a quantity of heat dissipated from the cooler.

8. A diagnostic method for a vehicle cooling system for a vehicle where a high-power unit is mounted, wherein the vehicle cooling system includes a first cooling system including a main passage structured to allow a first coolant to circulate through the main passage, wherein the high-power unit is structured to be cooled by the first coolant, wherein the first cooling system includes:

a radiator structured to perform heat exchange with the first coolant; a bypass passage connected to the main passage so as to bypass the radiator; and a bypass valve structured to control a flow rate of the first coolant flowing through the bypass passage, the diagnostic method comprising:

in response to a condition that a heat quantity transferred from the high-power unit to the first coolant after a startup of the vehicle cooling system has reached a predetermined value:

receiving, by a controller, a first temperature of the first coolant at a location downstream of the radiator and upstream of a downstream end of the bypass passage in a direction of flow of the first coolant;

calculating, by the controller, a second temperature of the first coolant based on the heat quantity; and diagnosing, by the controller, based on the first temperature and the second temperature, whether the bypass valve is in a state allowing the first coolant to flow to the radiator, or in a state preventing the first coolant from flowing to the radiator.

9. A vehicle cooling system diagnostic device for a vehicle where a high-power unit is mounted, the vehicle cooling system diagnostic device comprising:

a first cooling system structured to cool the high-power unit with a first coolant, wherein the first cooling system includes: a main passage structured to allow the first coolant to circulate through the main passage; a radiator structured to perform heat exchange with the first coolant; a bypass passage connected to the main passage so as to bypass the radiator; and a bypass valve structured to control a flow rate of the first coolant flowing through the bypass passage; and a controller configured to diagnose, based on a first temperature and a second temperature, whether the bypass valve is in a state allowing the first coolant to flow to the radiator, or in a state preventing the first coolant from flowing to the radiator, wherein the first temperature is a temperature of the first coolant at a first location of the main passage downstream of the radiator and upstream of a downstream end of the bypass passage in a direction of flow of the first coolant, and wherein the second temperature is a temperature of the first coolant at a second location of the main passage downstream of the downstream end of the bypass passage and upstream of the high-power unit in the direction of flow of the first coolant.

10. The vehicle cooling system diagnostic device as claimed in claim 9, wherein the controller is configured to diagnose that the bypass valve is in the state preventing the first coolant from flowing to the radiator, in response to a condition that a third temperature is lower than a first predetermined value, wherein the third temperature is a temperature of the first coolant at a third location of the main passage downstream of the high-power unit and upstream of the radiator in the direction of flow of the first coolant;

diagnose that the bypass valve is in the state allowing the first coolant to flow to the radiator, in response to a condition that the third temperature is higher than or equal to the first predetermined value; and diagnose that the bypass valve is faulty, in response to a condition that the state of the bypass valve identified by the diagnosis based on the first temperature and the second temperature is different from the state of the bypass valve identified by the diagnosis based on the third temperature.

11. The vehicle cooling system diagnostic device as claimed in claim 10, wherein the controller is configured to diagnose that the bypass valve is faulty, in response to a condition that the third temperature is higher than or equal to the first predetermined value, and a difference between the first temperature and the second temperature is larger than a second predetermined value.

12. The vehicle cooling system diagnostic device as claimed in claim 10, wherein the controller is configured to diagnose that the bypass valve is faulty, in response to a condition that the third temperature is lower than or equal to a third predetermined value, and a difference between the first temperature and the second temperature is larger than a second predetermined value.

13. The vehicle cooling system diagnostic device as claimed in claim 9, wherein the controller is configured to start diagnosis of the bypass valve, in response to a condition that a heat quantity transferred from the high-power unit to the first coolant after a startup of the vehicle cooling system has reached a predetermined value.

14. The vehicle cooling system diagnostic device as claimed in claim 13, wherein the controller is configured to:

calculate the heat quantity by subtracting a dissipated heat quantity from a generated heat quantity, wherein the dissipated heat quantity is a quantity of heat dissipated from the high-power unit into an engine compartment of the vehicle being a hybrid vehicle, and wherein the generated heat quantity is a quantity of heat generated by the high-power unit due to a loss in the high-power unit; and calculate the dissipated heat quantity, based on vehicle speed of the hybrid vehicle, outside air temperature, and temperature of the first coolant.

15. The vehicle cooling system diagnostic device as claimed in claim 13, wherein the first cooling system includes a cooler structured to cool supercharged intake air supplied to an internal combustion engine mounted on the vehicle, and the diagnostic method comprises calculating the heat quantity, taking account of a quantity of heat dissipated from the cooler.

16. The diagnostic method of claim 1, wherein the controller receives the first temperature from a first temperature sensor at the first location and receives the second temperature from a second temperature sensor at the second location.

17. The vehicle cooling system diagnostic device of claim 9, further comprising a first temperature sensor provided at the first location and configured to sense the first temperature, and a second temperature sensor provided at the second location and configured to sense the second temperature.

* * * * *